(12) United States Patent
Sparks et al.

(10) Patent No.: US 6,396,969 B1
(45) Date of Patent: May 28, 2002

(54) DISTRIBUTED OPTICAL SWITCHING DEVICE

(75) Inventors: Adrian P Sparks, Ongar; Peter D Roorda, Hertfordshire, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/470,630

(22) Filed: Dec. 22, 1999

(51) Int. Cl.[7] .............................. G02B 6/26; G02B 6/42
(52) U.S. Cl. .............................. 385/16; 385/17; 385/20; 385/18; 359/128
(58) Field of Search .............................. 385/16, 17, 18, 385/19, 20, 21; 359/128

(56) References Cited

U.S. PATENT DOCUMENTS

| | | | |
|---|---|---|---|
| 5,241,610 A | * | 8/1993 | Labiche ........................ 385/16 |
| 5,515,361 A | * | 5/1996 | Li .............................. 370/15 |
| 5,761,353 A | * | 6/1998 | Van Der Tol .................. 385/16 |
| 6,061,157 A | * | 5/2000 | Terahara ...................... 385/16 |

OTHER PUBLICATIONS

"Free–Space Micromachined Optical Switches for Optical Networking", F Y Lin, E L Goldstein and R W Tkach, IEEE Journal of Selected Topics in Quantum Electronics, vol. 5, No. 1, Jan./Feb. 1999.

* cited by examiner

Primary Examiner—Darren Schuberg
Assistant Examiner—Leo Boutsikaris
(74) Attorney, Agent, or Firm—Lee, Mann, Smith, McWilliams, Sweeney & Ohlson

(57) ABSTRACT

An optical switch comprising at least two segments, each segment having a respective input and a respective output, arranged such that in use if a first segment is removed, a second segment can operate as a pass-through device.

12 Claims, 8 Drawing Sheets

Working optical channels to protect Tx/Rx

Protect optical channels to working Tx/Rx

US 6,396,969 B1

DISTRIBUTED OPTICAL SWITCHING DEVICE

FIELD OF THE INVENTION

The present invention relates to an optical switch, and in particular to a distributed optical switch.

BACKGROUND OF THE INVENTION

Many industries utilise optical switches in their equipment. For instance, the telecommunications industry utilises optical switches in optical dedicated protection and optical shared protection rings (OSPR's). Optical transmission systems are often constructed with a fault recovery mechanism so that if there is a complete loss of transmission capability due to component and/or transmission line failure, the traffic can be reallocated to other physically diverse routes. Pending U.S. application Ser. No. 09/349,349 (incorporated herein by reference) describes such an OSPR system.

Switches are commonly incorporated in OSPR's at network nodes. At a network node, a 2×2 switch may be utilised to connect between working and protect transmitters/receivers and working and protect transmission lines. Although the OSPR is designed with a fault recovery mechanism, performance of the node will be seriously affected if a switch fails, or has to be removed for maintenance or in order to be replaced. In such an instance, switch failure maintenance can interrupt both working and protection traffic.

FIG. 1 shows a working (2) and protect (4) transmission line connected to respective working and protect receivers (6,8) via a 2×2 switch (10). Similarly, the working and protect transmission lines (2',4') may be connected to the working and protect transmitters (6',8') via a 2×2 switch (10'). Alternatively, a bidirectional 2×2 switch and a combination transmitter/receiver can be used before the outgoing and incoming paths are routed to transmitter and receiver respectively. This allows these two switches to be combined into one (not shown).

A 2×2 switch allows independent connection of working and protection optical channels (or transmission lines) to working or protection receiver or transmitter as appropriate. This functionality is required in both 1+1 (in which the same data is simultaneously transmitted along both the working and protection lines, providing redundancy in the event of either of the lines failing) and 1:1 protection switching (in which high priority data is typically transmitted along the working line, low priority data along the protect line; in the event of the working line failing, the high priority data is routed along the protect line).

FIG. 2 shows how such bidirectional 2×2 switches may be incorporated into an OSPR module 20, which includes an optical cross connect (oxc) 22. The OXC contains optical switches to route traffic off and on the shared protection as described in U.S. application Ser. No. 09/349,349. An OSPR will be comprised of nodes.

The above description is merely an example of how such an optical switch can be used. Many systems, not limited to telecommunications may utilise such optical switching arrangements. The failure of a switch, or a part of the switch, inevitably affects connectivity between the inputs and outputs, as does removal of the switch for repair or maintenance. The present invention aims to address some of the problems of the prior art.

SUMMARY OF THE INVENTION

In a first aspect, the present invention provides an optical switching segment comprising at least one input, at least one output, at least one connector arranged to be connectable to a further segment so as to provide at least one of a further input and a further output, and a switch arranged to selectively connect between two of said input, said output and said connector. Thus, such a segment could be installed in a network as part of an optical switch that is distributed; thus failure of any one segment, or its removal, need not affect all of the connectivity of the switch.

Preferably, said connector provides a further input and said switch is arranged to selectively connect said output to one of said input or said connector.

Alternatively, said connector provides a further output and said switch is arranged to selectively connect said input to one of said output and said connector.

In another aspect, the present invention provides an optical switch comprising at least two segments, each segment having a respective input and a respective output, arranged such that in use if a first segment is removed, a second segment can operate as a pass-through device.

In a further aspect, the present invention provides an optical switch distributed over at least two cards, the first card having a first input and a first output, and the second card having at least one of a second input and a second output, the switch further comprising a switching means arranged to selectively form a connection between two of said first input, said first output, and said second input and output, arranged such that said second card may be removed from communication with said first card whilst the switch is in use, said first card then being arranged to connect said first input to said first output.

Preferably, said cards are removably attached. Alternatively, detachment of the cards may require destruction or damage to one or more of any components that connect the cards, e.g. the cutting of an optical fibre connection.

Preferably, connecting means between the cards comprises at least one of a freespace optical beam path and a waveguide.

Preferably, said switching means comprises a selection from the group of polymer waveguides, mach-zehnders and MEMS (micro-electro mechanical systems).

Preferably, said switching means utilises the control of a selection from the group of reflection, refraction and diffraction to perform the switching.

The switch may further comprise a port for providing control signals to said switch.

In another aspect, the present invention provides a telecommunications system comprising a switch as claimed in claim 4.

Preferably, said switch is connected to a system, the respective inputs and outputs being selectively coupled together as required by an operator.

Preferably, a first portion of the switch is arranged to act as a pass-through device if a second portion of the switch is removed from the system.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF PREFERRED EMBODIMENTS

Figure 1:
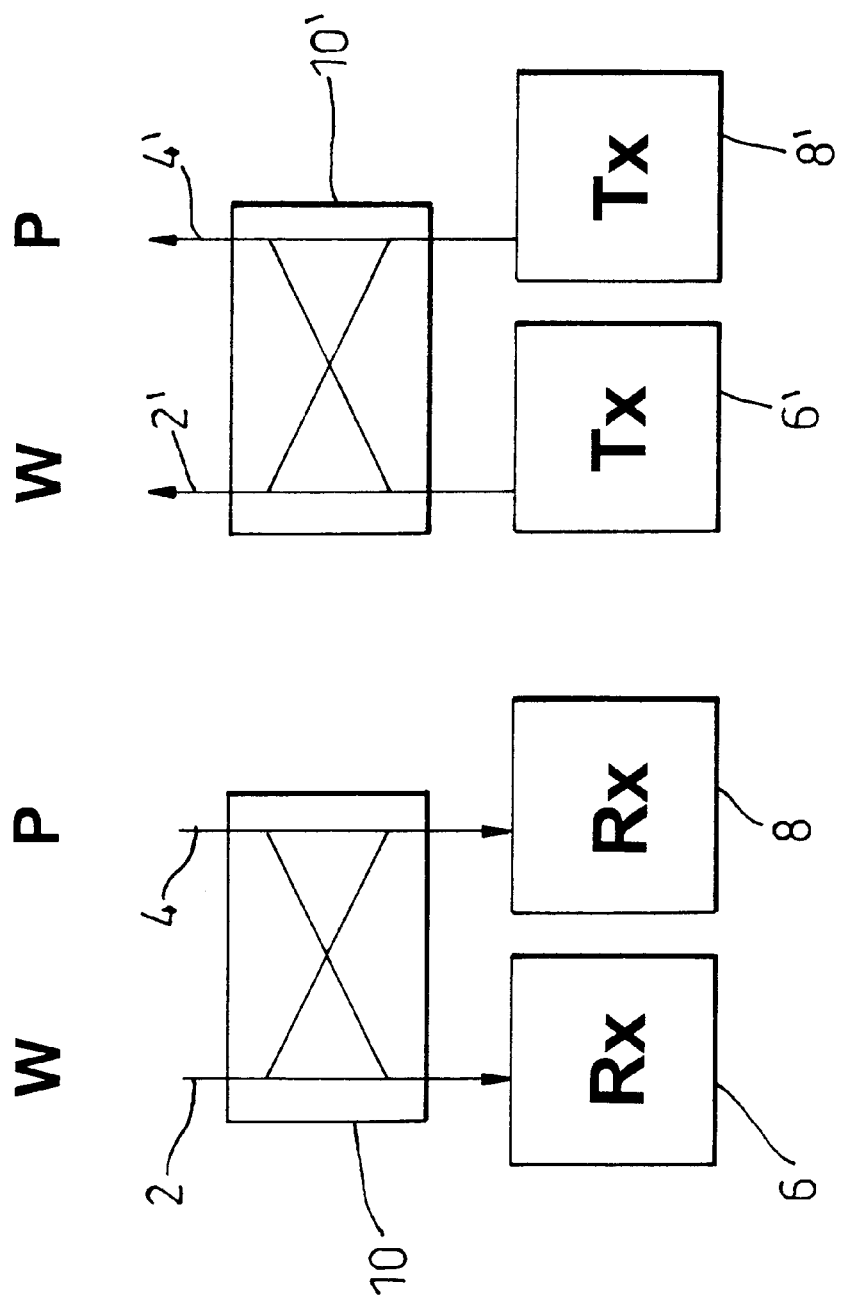
FIG. 1 illustrates the typical connections of a 2×2 switch in an OSPR node (PRIOR ART)
Figure 2:
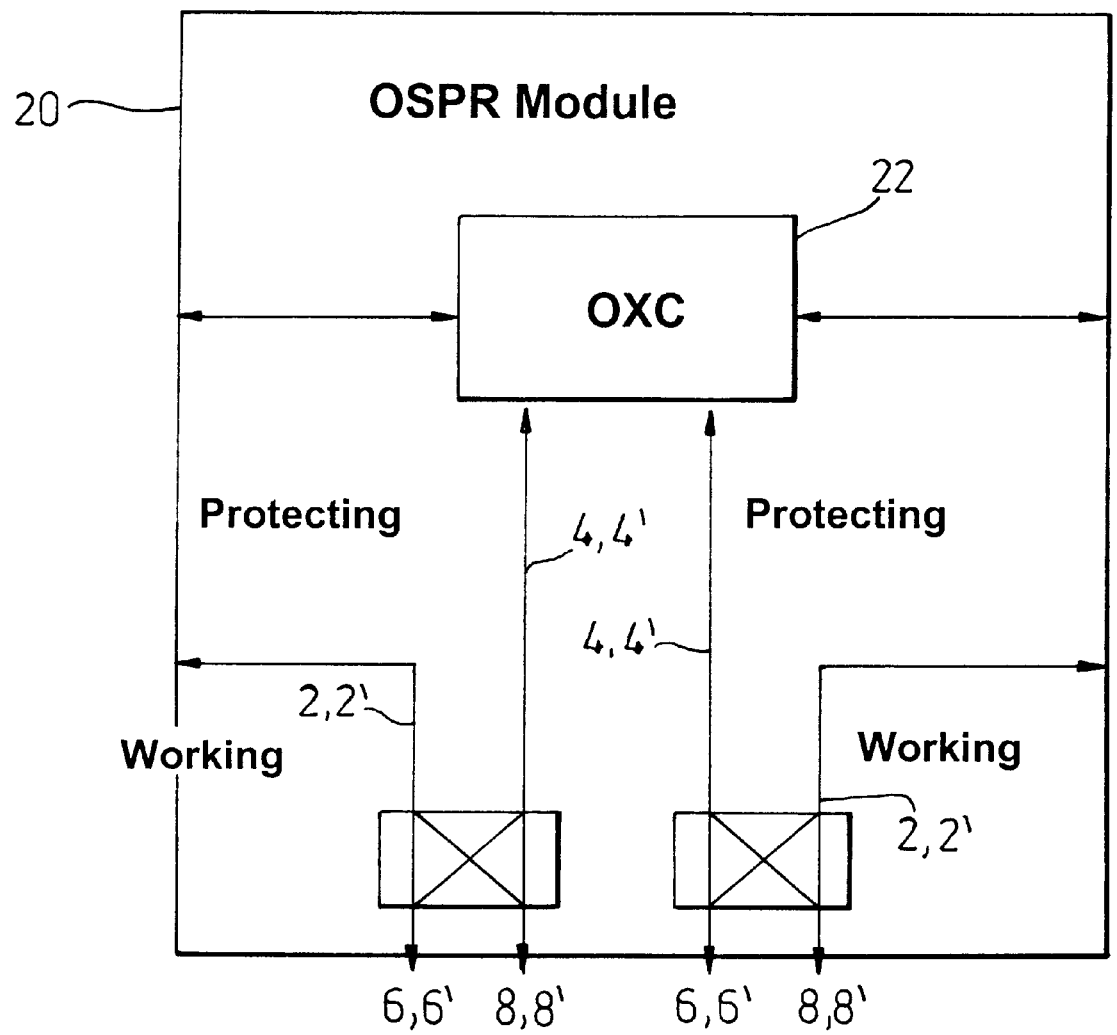
FIG. 2 illustrates an OSPR module (PRIOR ART)
Figure 3:
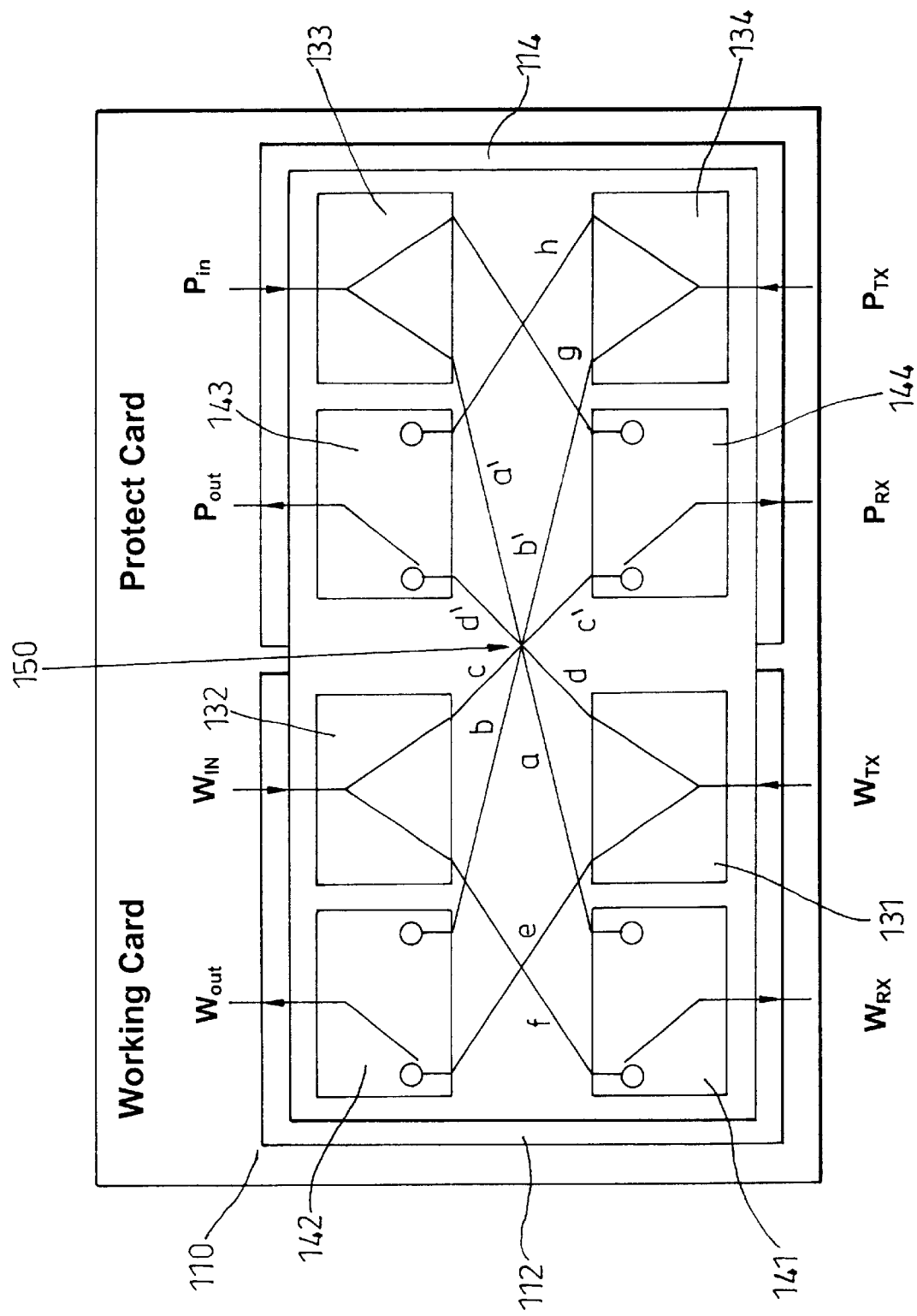
FIG. 3 illustrates a 2×2 switch according to an embodiment of the present invention.

FIG. 3 illustrates a 2×2 switch 110 comprising two cards 112,114. For convenience, to indicate their functionality within an OSPR module, the two cards have been labelled as a working card 112 and a protect card 114.

The switch 110 is implemented utilising a combination of splitters 131,132,133,134 and 1×2 switches 141,142,143, 144. If desired, each splitter could be replaced by a single 1×2 switch.

In the current implementation, each splitter 131,132,133, 134 is connected to two 1×2 switches 141,142,143,144 via an optical waveguide such as optical fibre a,b,c,d,e,f,g,h. This particular embodiment relates to a unidirectional system, with the arrow heads in the diagram being indicative of the direction in which the optical signals would be transmitted.

A connector 150 is used to connect the optical fibres of the working card to the respective optical fibres of the protect card, i.e. a is connected to a', b is connected to b', c is connected to c', and d is connected to d'. The connection between each of these fibres is removable. This facilitates easy separation of the cards.

It will be appreciated that the switching function of the switch shown in FIG. 3 is the same as the 2×2 switches of the prior art. In the configuration shown, $W_{Tx}$ (the working transmitter) can send a signal via the splitter 131 to both switch 142 via optical fibre e or via optical fibre d,d' to switch 143. It will therefore be appreciated that via appropriate control of the switches 142 and 143, the working transmitter may be connected to either or both of the working and protection transmission lines respectively via $W_{OUT}$ and $W_{OUT}$ This switch therefore provides the function required in 1+1 and 1:1 protection switching.

As the two cards 112,114 are removably attached via connector 150 (with any other connecting means between the two cards also being removably attached), either card can be removed. Traffic can then still flow through either the working or the protection optical channel, i.e. with the retained card acting as a pass through device. It will therefore be appreciated that any single component within the switch can fail, and traffic may still flow through either the working or protection channel. Alternatively, either card may be removed for maintenance or repair, with the remaining card acting as a pass through device to permit traffic to flow through the remaining channel.

Figure 4:
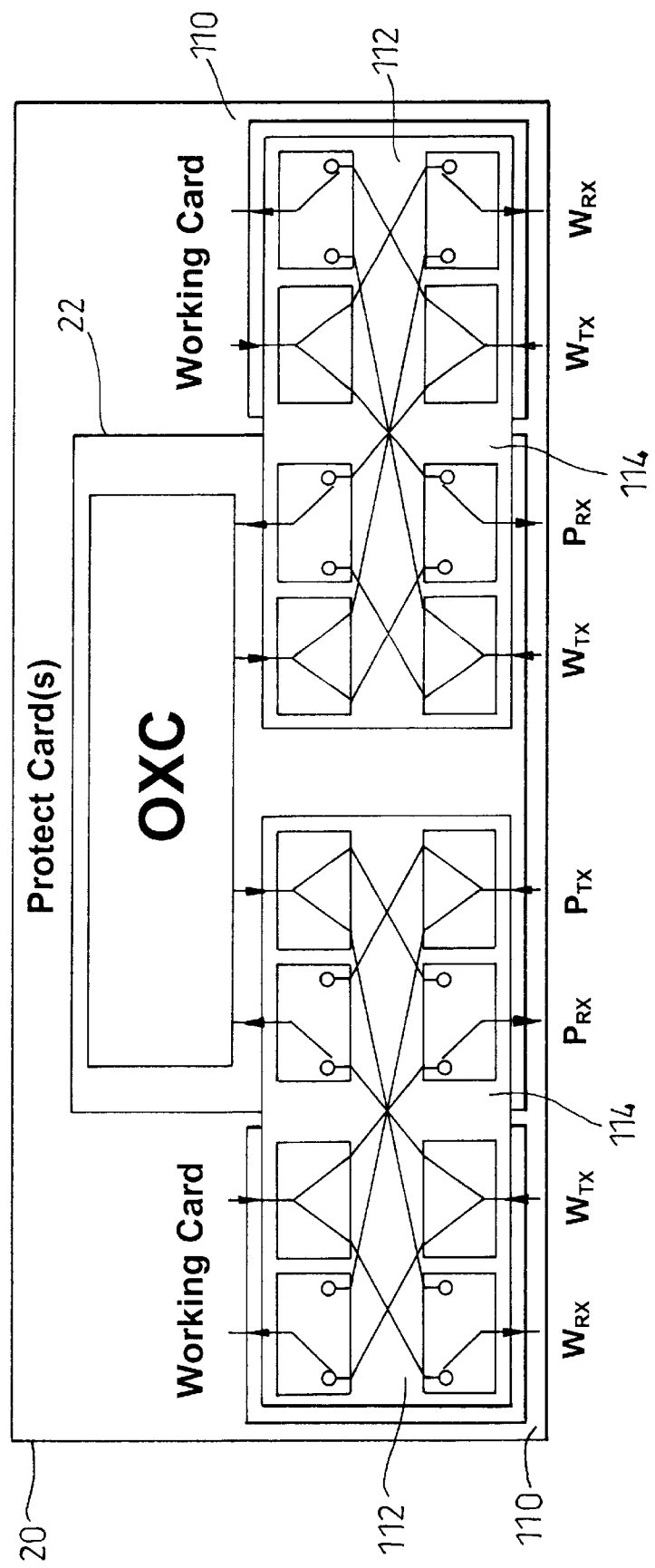
FIG. 4 illustrates how the OSPR shown in FIG. 2 can be implemented utilising two of the switches shown in FIG. 3.

FIG. 4 shows how two such cards may be implemented in an OSPR module. As can be seen, the appropriate protect card inputs and outputs are connected directly to the optical cross connect (OXC).

Figure 5:
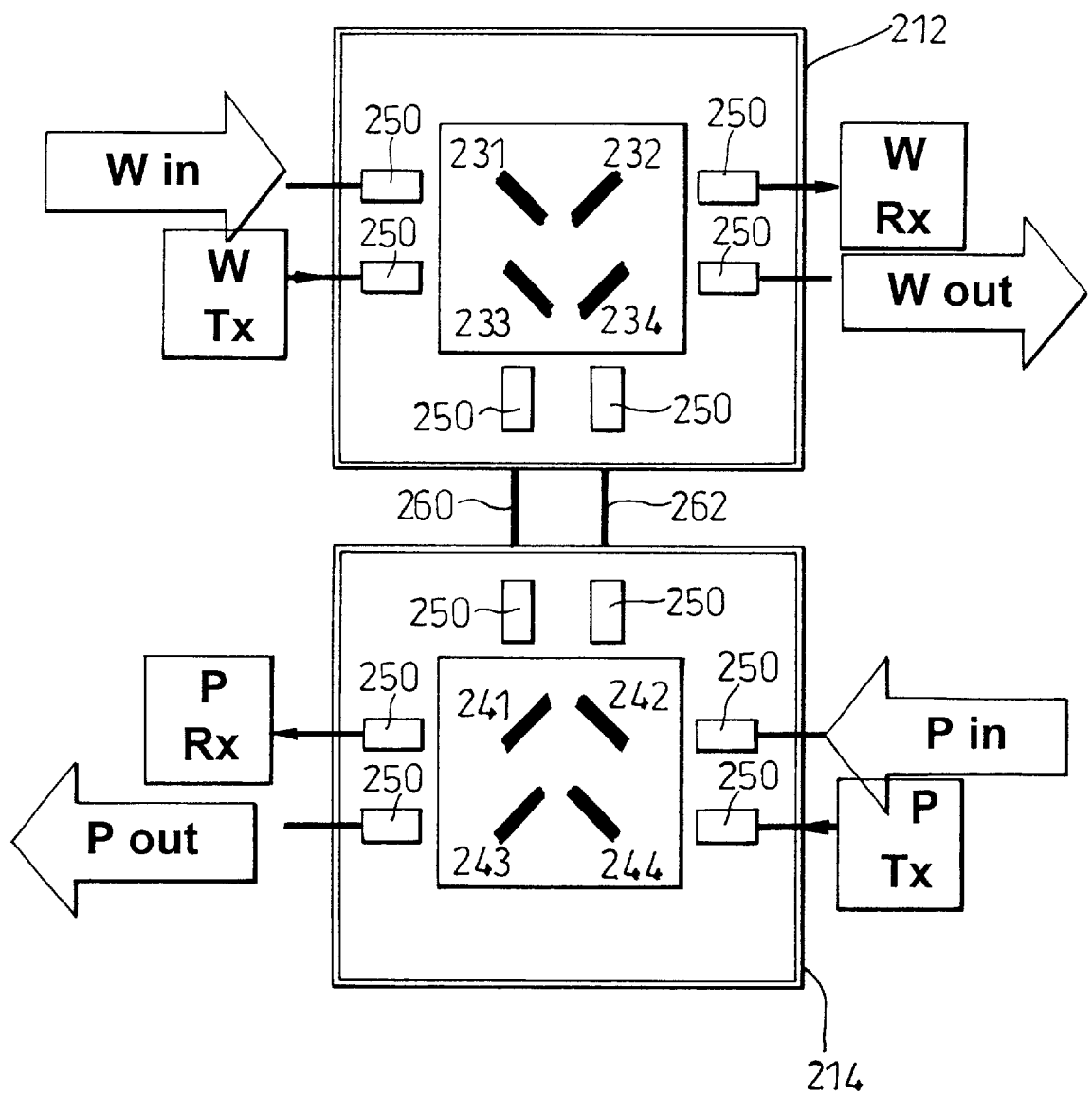
FIG. 5 illustrates a 2×2 switch in accordance with an alternative embodiment of he present invention.

An alternative embodiment of a 2×2 optical switch is shown in FIG. 5, which is implemented using MEMS (micro electro mechanical systems) technology. In this particular instance, the switching is performed utilising mirrors (231, 232,233,234 and 241,242,243,244). The mirrors are controlled such that they are either in an upright position (as shown in the plan view illustrated by FIG. 5) or alternatively flat against the MEMS chip surface (i.e. lying in the plane of the paper) in which case they are out of the optical path.

An example of such a switch is described in "Free-Space Micromachined Optical Switches for Optical Networking", F Y Lin, E L Goldstein and R W Tkach, IEEE Journal of Selected Topics in Quantum Electronics, Vol. 5, No. 1, January/February 1999.

The switch 210 comprises a working card 212 and a protect card 214. Each card has a respective transmitter input (Tx), receiver output (Rx), and transmission line input and output (IN,OUT). In this particular embodiment, each of the respective inputs and outputs are connected to a lens assembly 250 to ensure accurate collimation of the free space optical beam as a signal enters a card 212,214, and accurate. Focussing of the beam into the relevant fibre as the signal leaves the cards.

In this embodiment, the two cards are connected by two waveguides in the form of optical fibres 260,262. These fibres are removably attached to either one or both of the working and protect cards 212,214. It will be appreciated that in this instance only two fibres are required to propagate optical signals between the two cards, whilst in the previous embodiment four fibres were required.

Figure 6A:
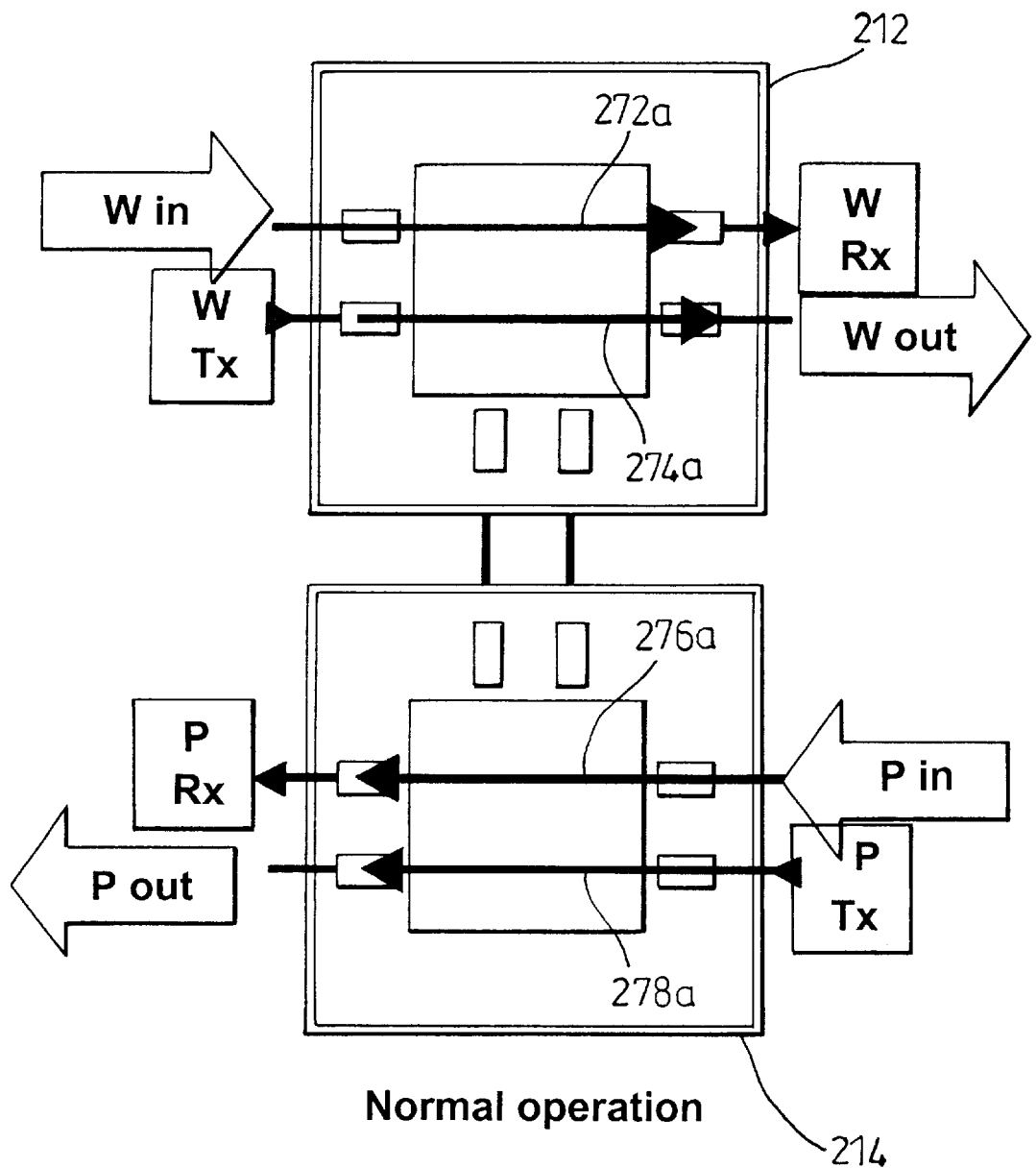
FIG. 6a illustrates the normal operation of the switch shown in FIG. 5.
Figure 6B:
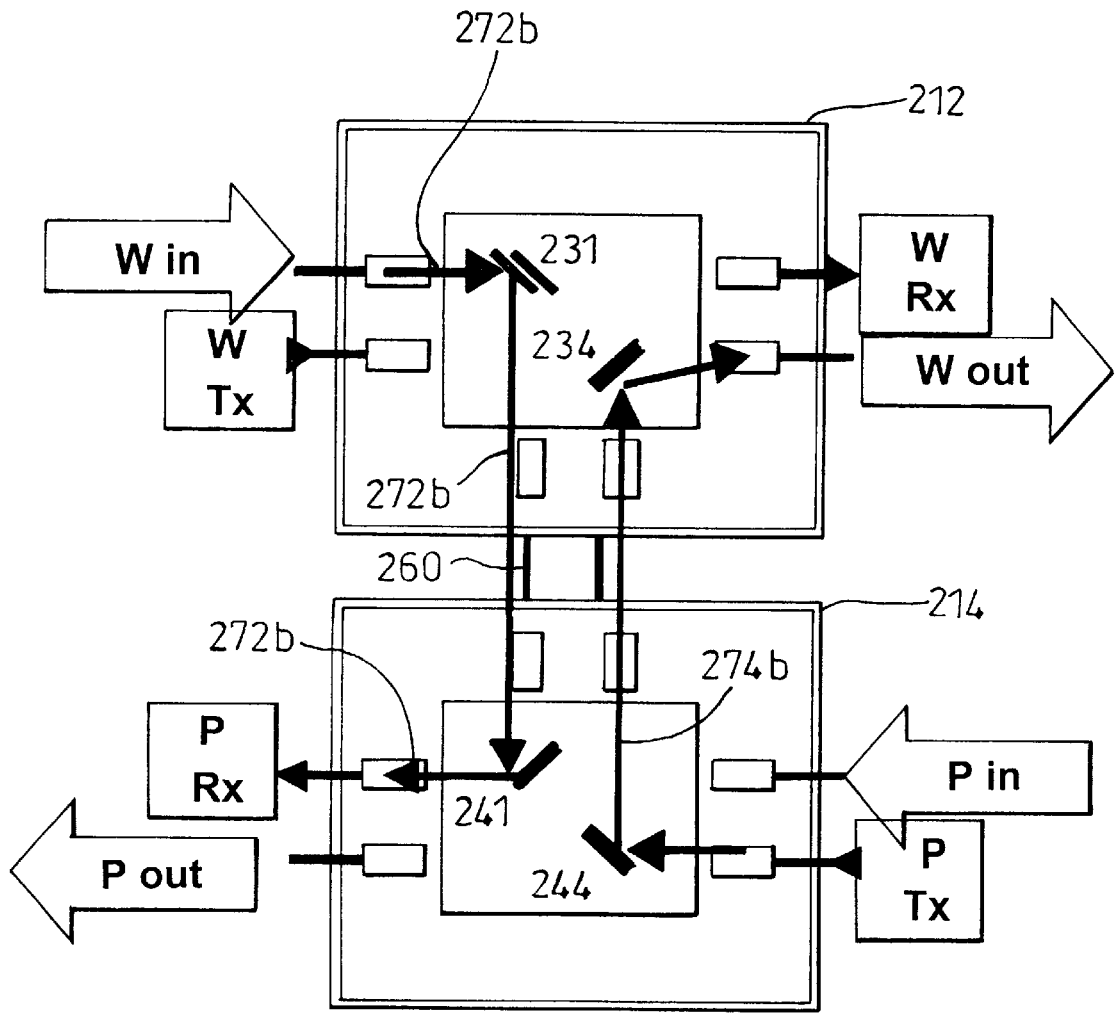
FIG. 6b illustrates a configuration of the switch shown in FIG. 5 in which the working optical channels are connected to the protect transmitter and receiver.
Figure 6C:
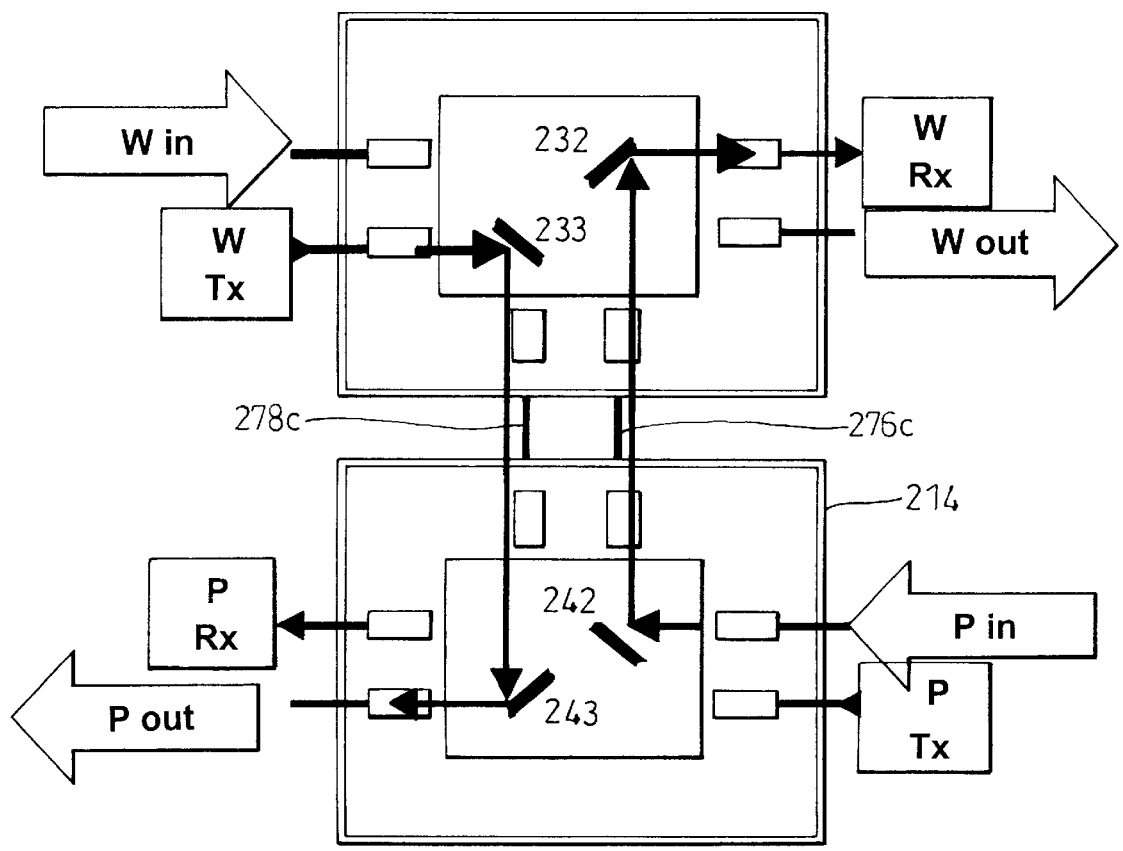
FIG. 6c illustrates a configuration of the switch shown in FIG. 5 in which the protect optical channels are connected to the working transmitter and receiver.

Operation of such a 2×2 switch is shown in FIGS. 6a to 6c. FIG. 6a shows a typical "normal operation" of the switch, in which all of the mirrors 231-4,244-4 lie flat against the MEM chip surface. Consequently, each of the cards 212,214 act as pass through devices. The optical signal from the working channel (Win) is propagated along the free space path 272a to the working receiver, the signal from the working transmitter propagates along the free space path 274a to the working channel output, the protect channel signal propagating along path 276a to the protect receiver, and the signal from the protect transmitter propagating along path 278a to the protect channel output.

If either card 212,214 is removed from the system in which such a switch is installed, it will be appreciated that the remaining card may continue to act as a pass through device.

FIG. 6b shows an alternative state of the switch in which mirrors 231,234,241,244 are in the upright position. Consequently the working optical channels are connected to the protect transmitter and receiver via the optical path 272b and 274b. For instance, a signal from the working channel Win will enter the working card 212, be collimated from the fibre into a free space beam 272b by a lens assembly, reflect off mirror 231, then be forwarded into fibre 260 by a further lens assembly. The signal will then be transmitted along fibre 260 to the protect card 214, pass through a further lens assembly for collimation into another free space beam, reflect from mirror 241 into a further lens assembly which will focus the beam into the fibre for transmission to the protect receiver $P_{RX}$.

FIG. 6c shows another state of the switch in which mirrors 233,232,243,242 are in the upright position. The protect optical channels are hence connected to the working transmitter and receiver via the optical path 278c and 276c.

Whilst the preferred embodiments have described specific implementations of the invention, it will be appreciated that the invention may be implemented utilising a variety of alternate optical switching configurations and/or technologies.

For instance, the switch could be implemented using polymer waveguide, mach zehnder, LC(liquid crystal), and/ or a variety of MEMS switching technologies. Such an LC switch is manufactured by SpectraSwitch of Santa Rosa, Calif., USA and Chorum Technologies, Inc of Richardson, Tex., USA.

For the purposes of this specification, the terms "optical" and "light" should be understood as pertaining not only to the visible part of the electromagnetic spectrum, but also to the infra-red and ultra-violet parts that bound the visible part.

Any range or device given herein may be extended or altered without losing the effect sought, as will be apparent to a skilled person from an understanding of the teaching herein. For instance, whilst the present invention has been described in relation to 2×2 switches, it will be appreciated that the invention can result in an N×M switch, arranged over two or more cards or portions, where N and M are both integers greater than 2. Equally, whilst the present invention has been illustrated by describing unidirectional 2×2 switches for bidirectional optical signals.

What is claimed is:

1. An optical switching segment comprising at least one input, at least one output, at least one connector arranged to be removably connectable to a further segment so as to provide at least one of a further input and a further output, and a switch arranged to selectively connect between two of said input, said output and said connector.

2. A switching segment as claimed in claim 1, wherein said connector provides a further input and said switch is arranged to selectively connect said output to one of said input or said connector.

3. A switching segment as claimed in claim 1, wherein said connector provides a further output and said switch is arranged to selectively connect said input to one of said output and said connector.

4. An optical switch comprising at least two segments, each segment having a respective input and a respective output, arranged such that in use if a first segment is removed, a second segment can operate as a pass-through device, the segments being removably attached.

5. An optical switch distributed over at least two cards, said cards being removably attached, the first card having a first input and a first output, and the second card having at least one of a second input and a second output, the switch further comprising a switching means arranged to selectively form a connection between two of said first input, said first output, and said second input and output, arranged such that said second card may be removed from communication with said first card whilst the switch is in use, said first card then being arranged to connect said first input to said first output.

6. A switch as claimed in claim 5, further comprising connecting means for providing a connection between the cards, said connecting means comprising at least one of a freespace optical beam path and a waveguide.

7. A switch as claimed in claim 5, wherein said switching means comprises a selection from the group of
polymer waveguides, mach-zehnders and MEM's (microelectro mechanical systems).

8. A switch as claimed in claim 5, wherein said switching means utilises the control of a selection from the group of reflection, refraction and diffraction to perform the switching.

9. A switch as claimed in claim 5, further comprising a port for providing control signals to said switch.

10. A telecommunications system comprising an optical switch comprising at least two segments, each segment having a respective input and a respective output, arranged such that in use if a first segment is removed, a second segment can operate as a pass-through device, the segments being removably attached.

11. A method of operating an optical switch comprising at least two segments, each segment having a respective input and a respective output, arranged such that in use if a first segment is removed, a second segment can operate as a pass-through device, the segment being removably attached, wherein said switch is connected to a system, said respective inputs and outputs being selectively coupled together as required by an operator.

12. A method as claimed in claim 11, wherein a first portion of the switch is arranged to act as a pass-through device if a second portion of the switch is removed from the system.

* * * * *